United States Patent [19]
Yamanaga et al.

[11] Patent Number: 4,794,690
[45] Date of Patent: Jan. 3, 1989

[54] PHASE ADJUSTING APPARATUS IN ASSEMBLING MACHINE

[75] Inventors: Junichi Yamanaga; Keiichiro Gunji; Yousuke Narita; Toshiaki Nagasawa; Yoshifumi Kawabata, all of Sayama, Japan

[73] Assignee: Honda Giken Kogyo Kabushiki Kaisha, Tokyo, Japan

[21] Appl. No.: 100,860

[22] Filed: Sep. 25, 1987

[51] Int. Cl.$^4$ .................. B23P 21/00; B23Q 15/00; B23K 37/00
[52] U.S. Cl. ............................................ 29/709; 29/705
[58] Field of Search .................................. 29/705, 709

[56] References Cited
U.S. PATENT DOCUMENTS 4,581,816  4/1986  Ulufus et al. ........................ 29/705
4,590,653  5/1986  Ades et al. ........................ 29/705 X

FOREIGN PATENT DOCUMENTS 59-73374  4/1984  Japan .

Primary Examiner—Timothy V. Eley
Attorney, Agent, or Firm—Armstrong, Nikaido, Marmelstein & Kubovcik

[57] ABSTRACT

A phase adjusting apparatus for use in an assembling machine for assembling first and second workpieces including a movable frame which is arranged to move into and out of the space formed between the two workpieces. Prior to coupling the two workpieces, the movable frame is moved to enter the space and a first movable table and a second movable frame are used to adjust the phase of a rotary body on the first workpiece and the phase of a rotary shaft on the second workpiece to another. After removing the movable frame from the space, the two workpieces are then brought together so that the rotary body and the rotary shaft are coupled to each other.

4 Claims, 4 Drawing Sheets

PHASE ADJUSTING APPARATUS IN ASSEMBLING MACHINE

BACKGROUND OF THE INVENTION

1. Field of the Invention

This invention relates to a phase adjusting apparatus for use in an assembling machine in which a first workpiece such as an engine and a second workpiece such as a transmission are assembled in which a rotary body such as a clutch unit or a torque converter, rotatably provided in the first workpiece, and a rotary shaft such as a main shaft, rotatably provided on the second workpiece, are coupled to each other through a splined engagement in alignment on the same axis without the relative rotation thereof.

2. Description of the Prior Art

In the prior art when assembling an engine provided with a clutch unit and a transmission, the engine and the transmission are positioned face to face in alignment with each other on the same axis and are then brought close to one another. At predetermined positions thereof, a phase adjustment is carried out by manually turning the main shaft such that teeth of a splined engaging portion formed on the outer periphery of a forward end portion of the main shaft are brought into alignment with flutes between the teeth of a splined engaging opening formed on a boss of a clutch disc. Thereafter, the engine and the transmission are brought still closer to one another so that the clutch disc and the main shaft are spline coupled.

As mentioned above, the conventional phase adjustment has been carried out manually, which results in poor workability. This is particularly poor where a clutch case is combined with the transmission, the engaging part of the main shaft being hidden out of sight by the clutch case. The phase adjustment is very difficult in this case.

In addition, when an engine provided with a torque converter unit and a transmission are assembled together, it has been necessary that a first engaging part on the outer periphery of the main shaft be coupled with a first splined opening formed in the turbine wheel of the torque converter unit. A second engaging part is formed on a stator shaft on the outer periphery of the main shaft and is coupled with a second splined opening formed in the stator wheel of the unit. A third engaging part is formed on the pump wheel of the unit and is coupled with a third splined opening formed in a pump gear on the outer periphery of the stator shaft rotatable provided on the transmission. All of the above operations have included manual alignment.

SUMMARY OF THE INVENTION

It is a primary object of the present invention to provide an apparatus for automatically adjusting the phase of two elements to be coupled together to thereby align the elements for coupling.

It is another object of the present invention to automatically adjust the phase of pairs of splined openings and engaging parts to facilitate the assembly of the pairs of parts.

The present invention is directed to a phase adjusting apparatus in an assembling machine of the type in which a first workpiece, on which a rotary body is rotatably mounted, and a second workpiece, on which a rotary shaft is rotatably mounted, are positioned to face each other so that the axis of the rotary body and the axis of the rotary shaft are in axial alignment with each other. In this condition, the workpieces are brought together so that an engaging opening in the rotary body, such as a fluted opening having at its inner periphery at least one recess is coupled with an engaging part on the rotary shaft such as a toothed part having at its outer periphery at least one projection. In the mutually coupled condition thereof both workpieces are thus assembled to each other. The phase adjusting apparatus is characterized in that there is a movable frame which is movable into and out of the space formed between the first workpiece and the second workpiece. A first movable table is provided on a movable frame, the table being operable to advance toward and retract from the rotary body. A second movable table is operable to advance toward and retract from the rotary shaft. The first movable table is provided with a master shaft which has an engaging part corresponding with the engaging part of the rotary shaft which is driven to rotate by a rotation means, and a first detecting means which detects the phase of the master shaft. The second movable table is provided with a master sleeve which has an engaging opening corresponding with the engaging opening of the rotary body which is driven to rotate by a rotation means, and a second detecting means for detecting the phase of the master sleeve.

A second feature of the present invention is directed to a phase adjusting apparatus in an assembling machine of the type in which an engine having a crankshaft coupled to a torque converter unit comprising a turbine disc wheel, a stator wheel and a pump wheel is a first workpiece and a transmission which is a second workpiece are positioned to face each other so that the axis of the torque converter unit and the axis of the main shaft rotatably provided on the transmission are in alignment with each other. In this condition, the first and second workpieces are brought together so that a first splined opening formed on the turbine wheel is coupled with a first engaging part formed on the outer periphery of the main shaft, a second splined opening formed on the stator wheel is coupled with a second engaging part formed on a stator shaft on the outer periphery of the main shaft, and a third splined opening formed on a pump gear on the outer periphery of the stator shaft rotatably provided on the transmission is coupled with a third engaging part formed on the pump wheel. In this condition, the engine and the transmission are thus assembled with each other. The present invention is characterized in that a movable frame is provided which is movable into and out of the space formed between the engine and the transmission. A first movable table is provided on the movable frame and is operable to advance toward and retract from the torque converter unit. A second movable table is also provided on the movable frame and is operable to advance toward and retract from the main shaft. The first movable table is provided with a rotatable first master shaft which has two engaging parts corresponding with the first engaging part and the second engaging part, a first detecting means for detecting the phase of the first master shaft, a rotatable first master sleeve which has an engaging opening corresponding with the third splined opening and a second detecting means for detecting the phase of the first master sleeve. The second movable table is provided with a rotatable second master sleeve which has two engaging openings corresponding with the first splined opening and the second splined opening, a third detecting means for detecting the phase of the second master sleeve, a rotatable second master shaft which has an engaging part corresponding with the third engaging part and a fourth detecting means for detecting the phase of the second master shaft.

DETAILED DESCRIPTION OF THE PREFERRED EMBODIMENTS

Figure 1:
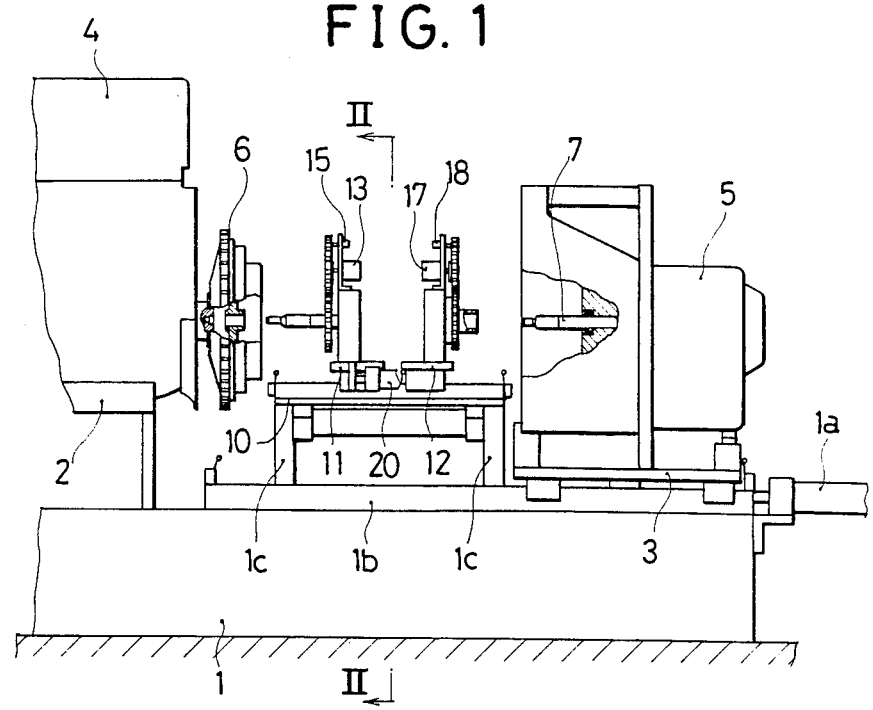
FIG. 1 is an elevational view of one embodiment of an assembling machine of the present invention.
Figure 2:
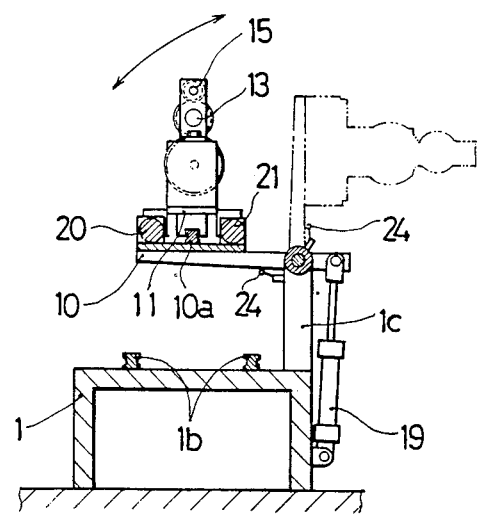
FIG. 2 is a sectional side view thereof taken along the line II—II in FIG. 1.
Figure 3:
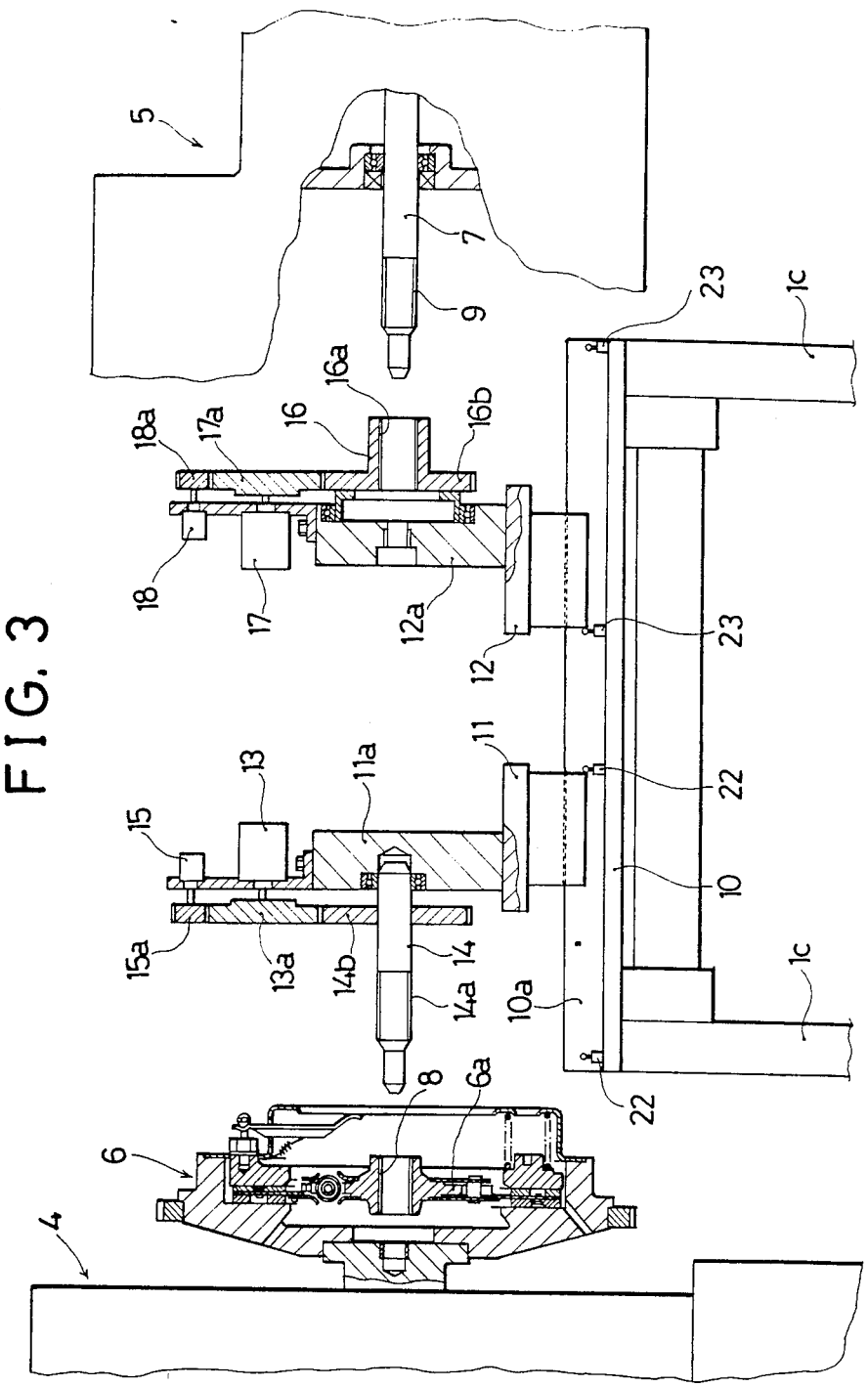
FIG. 3 is an enlarged sectional elevational view thereof.

Referring to FIG. 1 to FIG. 3 showing one embodiment of the present invention, a stationary jig table 2 is provided on one side of the top surface of the base 1, and a movable jig table 3 is arranged to be operated by a cylinder 1a to move along rails 1b on the base 1, to advance toward and retract from the stationary jig table 2. A vehicle engine 4 is a first workpiece on the stationary jig table 2 and a transmission 5 is a second workpiece on the movable jig table 3. The engine 4 and transmission 5 are disposed to face each other and are set in a position such that the axis of a clutch unit 6, which is a rotary body rotatably mounted on the engine 4 and the axis of a main shaft 7, which is a rotary shaft rotatably mounted on the transmission 5, are in alignment with each other on the same axis. The transmission 5 is brought to approach the engine 4 by advancing the movable jig table 3 toward the stationary jig table 2 by operation of the cylinder 1a so that an engaging part 9 comprising a splined shaft formed at a forward end of the main shaft 7 may be mounted into, that is, coupled with an engaging opening 8 comprising splined grooves formed in a boss of a clutch disc 6a of the clutch unit 6. With this arrangement, according to the present invention, a movable frame 10 is arranged to move into and out of the space between the engine 4 and the transmission 5, and the movable frame 10 is provided with a first movable table 11 arranged to advance toward and retract from the clutch unit 6 of the engine 4. A second movable table 12 on the movable frame 10 is arranged to advance toward and retract from the main shaft 7 of the transmission 5. The first movable table 11 is provided with a master shaft 14, which has an engaging part 14a corresponding to engaging part 9. The master shaft 14 is driven by a rotation means 13, and a first detecting means 15 detects the phase of the master shaft 14. The second movable table 12 is provided with a master sleeve 16, which has an engaging opening 16a corresponding to the engaging opening 8. The master sleeve 16 is driven by a rotation means 17, and a second detecting means 18 detects the phase of the master sleeve 16.

In more detail, the movable frame 10 is rotatably mounted on a shaft on stays 1c, which are upright on the upper surface of the base 1. A piston rod of a cylinder 19, rotatably mounted on the base 1, is attached to the movable frame 10 so that the reciprocating movement of the cylinder 19 swings the movable frame 10 about shaft 1a and thereby the movable frame 10 is moved into and out of the pace.

Further, the first and second movable tables 11 and 12 are mounted on a single common guide rail 10a provided on the movable frame 10, and are moved forward and rearward by the operation of respective cylinders 20 and 21 provided horizontally along the movable frame 10. A bracket 11a is provided upright on the first movable table 11, the master shaft 14 is rotatably attached, at an end portion, to the bracket 11a, and a pinion gear 13a on an output shaft of a motor 13 attached to the bracket 11a, meshes with a gear 14b fixed to the shaft 14. In addition, the first detecting means 15 comprising an encoder is provided with a gear 15a on the forward end thereof which meshes with the pinion gear 13a. Furthermore, the second movable table 12 is arranged in a similar manner as the first movable table 11, with a bracket 12a provided upright on the table 12, and the master sleeve 16 is rotatably attached, at its end portion, to the bracket 12a. A pinion gear 17a on an output shaft of a motor 17 attached to the bracket 12a, meshes with a gear 16b n the outer periphery of the sleeve 16, and, in addition, the second detecting means 18 comprising an encoder is provided with a gear 18a on the forward end thereof which meshes with the pinion gear 17a. Limit switches 22 detect the advanced and retracted positions of the first movable table 11, namely, an advanced position in which the master shaft 14 is mounted in the engaging opening 8 up to a predetermined depth, and a retracted position in which the shaft 14, is separated from the engaging opening 8. Limit switches 23 detect the advanced and retracted positions of the second movable table 12, namely, an advanced position in which the master sleeve is mounted on the main shaft 7 up to a predetermined depth, and a retracted position in which the sleeve 16 is separated from the main shaft 7. Limit switches 24 detect the advanced and retracted positions of the movable frame 10, namely, an advanced position in which the movable frame 10 is positioned in the space between the engine 4 and the transmission 5 and a retracted position in which the movable frame 10 is away from the space between the engine and the transmission.

Next, the operation of the foregoing embodiment will be described:

After the movable frame 10 is swung to move into the space between the engine 4 and transmission 5 to be positioned at the advanced position, the first movable table 11 and the second movable table 12 are moved in their respective forward directions while the master shaft 14 and the master sleeve 16 are being turned by the rotation means 13 and 17. Thus, the engaging part 14a of the master shaft 14 is positioned in the engaging opening 8 of the clutch unit 6 and the engaging opening 16a of the master sleeve 16 is positioned in the engaging part 9 of the main shaft 7, respectively. Thereafter, the rotation of the master shaft 14 and the master sleeve 16 are stopped and the respective advance movements of the first and second movable tables 11 and 12 are stopped, and the respective phases of the master shaft 14 and the master sleeve 16 are detected by the respective first and second detecting means 15 and 18. The phase of either one of the shaft 14 or the sleeve 16, for instance, that of the master shaft 14, is taken as a base or reference, the master sleeve 16 is then turned by the phase difference between the two by the rotation means 17, and thereby the phase of the master shaft 14 and that of the master sleeve 16 are adjusted to one another, that is, master shaft 14 and master sleeve 16 are in alignment with each other. Consequently, the clutch unit 6 and the main shaft 7 are brought into a phase alignment condition so that the engaging openings 8 and the engaging part 9 can be coupled to each other.

Thereafter, the first and second movable table 11 and 12 are moved in their respective backward directions so that the master shaft 14 is disengaged from the engaging opening 8 and the master sleeve 16 is disengaged from the engaging part 9, respectively, and the movable frame 10 is then swung backwards out of the space to the retracted position. Thereafter, the engine 4 constituting the first workpiece and the transmission 5 constituting the second workpiece are brought together so that the engaging part 9 of the main shaft 7 is coupled with the engaging opening 8 of the clutch unit 6.

Further, in the foregoing embodiment, the invention is applied to the phase alignment and coupling of a splined opening and a splined shaft. However, this invention is not limited to this type of structure and it can be applied to a phase adjustment and coupling between a key and a key groove or flute. Further, the above embodiment is explained in relation to an engine and a transmission which are used as the first workpiece and the second workpiece, respectively. The first and second workpieces are not, however, limited to an engine and a transmission.

Figure 4:
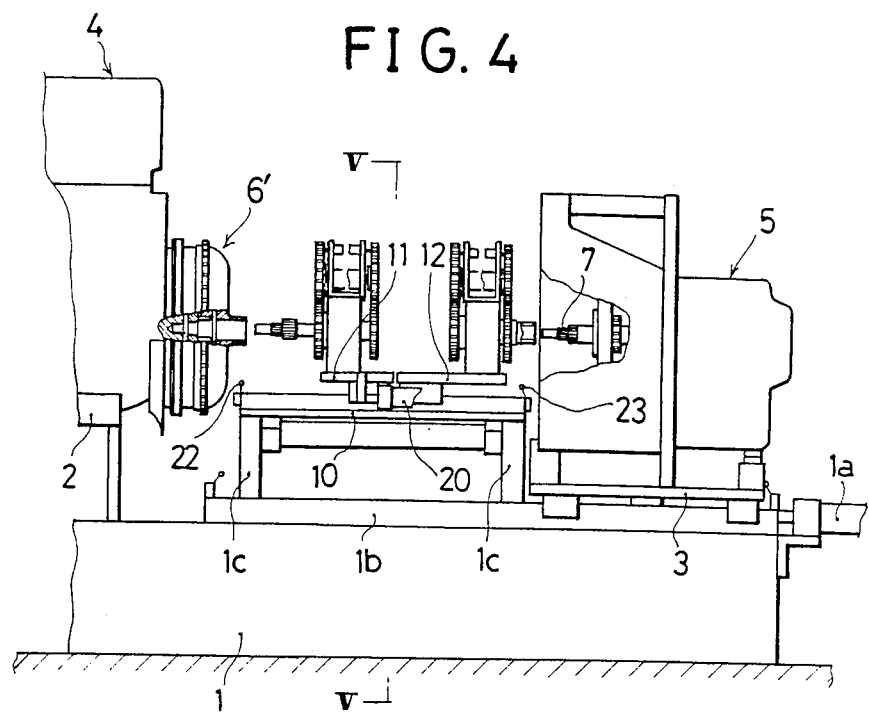
FIG. 4 is an elevational view of a second embodiment of an assembling machine of the present invention.
Figure 5:
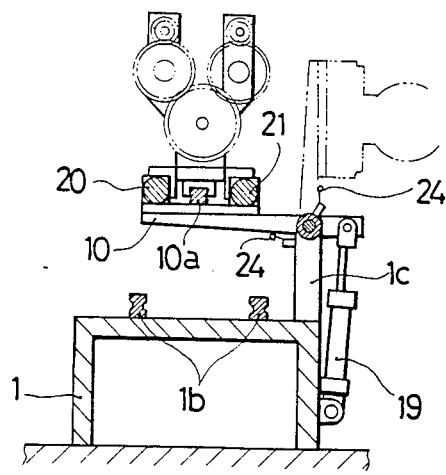
FIG. 5 is a sectional view thereof taken along the line V—V in FIG. 4.
Figure 6:
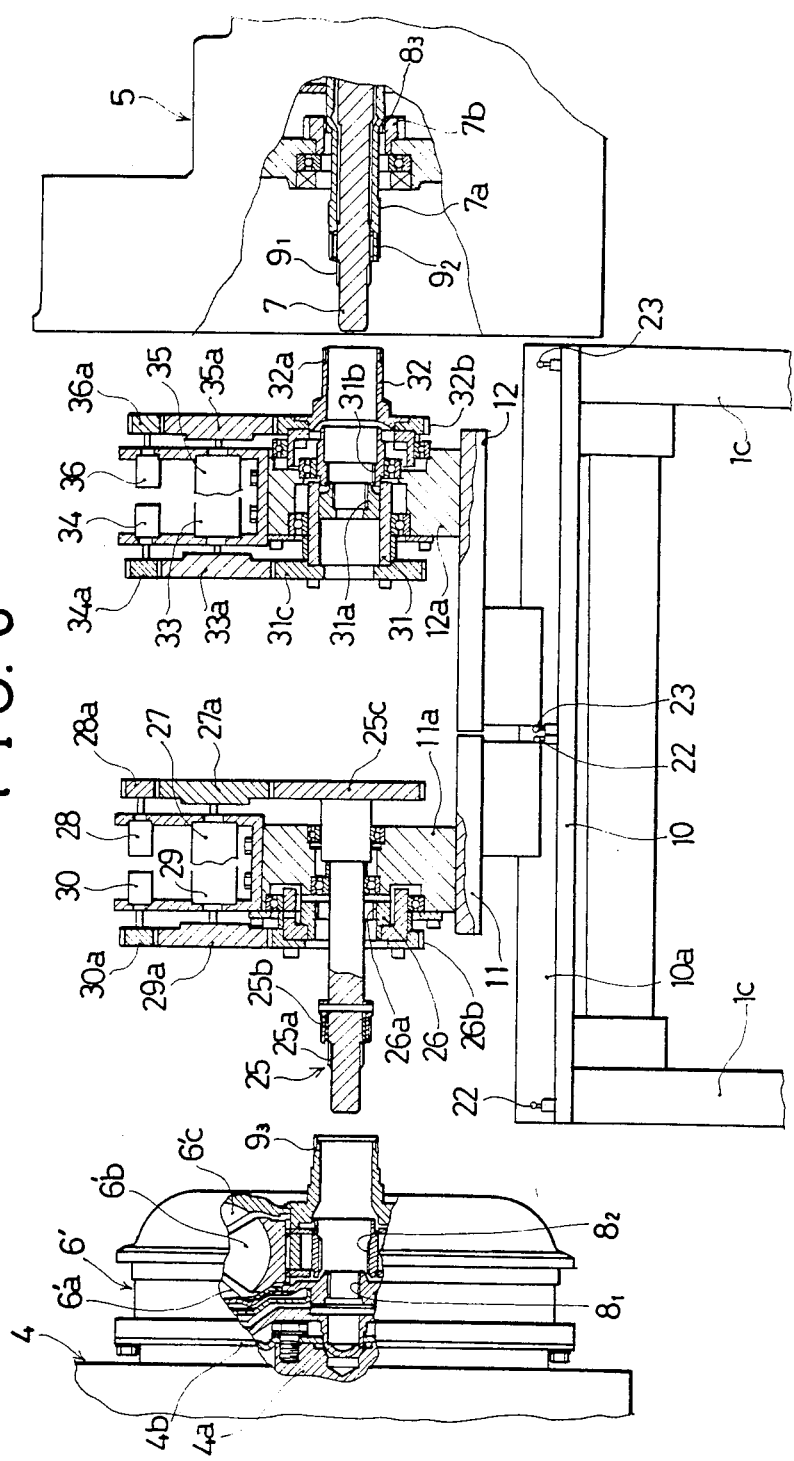
FIG. 6 is an enlarged sectional elevational view thereof.

Another embodiment is shown in FIG. 4 to FIG. 6, which shows the assembling of the engine 4 having a torque converter 6', and the transmission 5. The basic construction thereof is not particularly different from the above first embodiment and the corresponding elements have the same reference numerals so that the explanation thereof may be omitted.

The torque converter 6', as shown in FIG. 6, is connected to a crank shaft 4a of the engine 4 through a drive plate 4b and is provided therein with a turbine wheel 6'a, a stator wheel 6'b and a pump wheel 6'c. A first splined opening $8_1$, formed in the turbine wheel 6'a, is adapted to be coupled with a first engaging part $9_1$, comprising a splined portion formed on the outer periphery of the forward end of the main shaft 7 of the transmission. A second splined opening $8_2$ formed in the stator wheel 6'b, is adapted to be coupled with a second engaging part $9_2$ formed on a stator shaft 7a on the outer periphery of the main shaft 7. A third splined opening $8_3$ formed on a pump gear 7b on the outer periphery of the stator shaft 7a, rotatably attached to the transmission 5, is adapted to be coupled with a third engaging part $9_3$ formed on the outer periphery of a hub of the pump wheel 6'c.

A first master shaft 25 having two engaging parts 25a, 25b corresponding with the first and second engaging parts $9_1$ and $9_2$ and a first master sleeve 26 having an engaging opening 26a corresponding with the third splined opening $8_3$ are rotatably supported on the bracket 11a which is positioned upright on the first movable table 11. The engaging opening 26a and third splined opening $8_3$ are positioned on the same axis. The bracket 11a is provided with a rotation means 27 for the shaft 25 comprising a motor having a pinion gear 27a provided on an output shaft and meshed with a gear 25c fixed to the shaft 25. A first detecting means 28 comprising an encoder has a gear 28a on an input shaft meshed with the pinion gear 27a. A rotation means 29 for the sleeve 26 comprises a motor having a pinion gear 29a on an output shaft meshed with a gear 26b fixed to the sleeve 26. A second detecting means 30 comprising an encoder has a gear 30a on an input shaft meshed with the pinion gear 29a. In addition, a master sleeve 31 having two engaging openings 31a and 31b corresponding with the first and second splined openings $8_1$ and $8_2$ and a hollow master shaft 32 having an engaging part 32a corresponding with the engaging part $9_3$ are rotatably supported on the bracket 12a, which is positioned upright on the second movable table 12. The master shaft 32 and engaging part 32a are positioned on the same axis. The bracket 12a is provided with a rotation means 33 for the sleeve 31 comprising a motor having a pinion gear 33a on an output shaft meshed with a gear 31c fixed to the sleeve 31. A third detecting means 34 comprising an encoder has a gear 34a on an input shaft thereof meshed with the pinion gear 33a. A rotation means 35 for the shaft 32 comprises a motor having a pinion gear 35a on an output shaft meshed with a gear 32b fixed to the hollow shaft 32. a fourth detecting means 36 comprising an encoder has a gear 36a on an input shaft meshed with the pinion gear 35a.

Furthermore, the engaging openings 31a and 31b of the second master sleeve 31 are, since the stator shaft 7a is a stationary shaft, so arranged as to have a positional relation with the stator shaft 7a wherein in the course of advancing of the second movable table 12, before the forward end of the engaging opening 31b corresponding with the second splined opening $8_2$, reaches the second engaging part $9_2$, the forward end of the engaging opening 31a corresponding with the first splined opening $8_1$, reaches the first engaging part $9_1$, and also before the engaging opening 31b is coupled with the second engaging part $9_2$ and the rotation of the master sleeve 31 is stopped by the stator shaft 7a, the engaging opening 31a is coupled with the first engaging part $9_1$.

When the engine 4 and the transmission 5 are intended to be assembled together by the above apparatus, the movable frame 10 is swung about the axis to enter the space between the engine 4 and transmission 5 at the advanced position, and thereafter, by the respective rotation means 27, 29, 33 and 35, the first and second master shafts 25 and 32 and the first and second master sleeves 26 and 31 are rotated. During the rotation thereof, the first movable table 11 and the second movable table 12 are moved to advance in their respective directions, and thereby the engaging parts 25a and 25b of the first master shaft 25 are coupled with the first and second splined openings $8_1$ and $8_2$, respectively. The engaging opening 26a of the first master sleeve 26 is coupled with the third engaging part $9_3$, and meanwhile, the engaging openings 31a and 31b of the second master sleeve 31 are coupled with the first and second engaging parts $9_1$ and $9_2$, respectively, and the engaging part 31a of the second master shaft 32 is coupled with the third splined opening $8_3$. Thereafter, the rotation of the first and second master shafts 25 and 32 and rotation of the first and second master sleeves 26 and 31 are stopped, and at the same time, the advance movements of the first and second movable tables 11 and 12 are stopped. Thereafter, the respective phases of the first and second master shafts 25 and 32 and the first and second master sleeves 26 and 31 are detected by the first to fourth detecting means 28, 30, 34 and 36, and while the phase of the first master sleeve 26 is used as a base or reference, the second master shaft 32 is turned by a phase difference by the rotation means 35, and also with the phase of the second master sleeve 31 being used as a base or reference, the first master shaft 25 is turned by a phase difference by the rotation means 27. Thereby, the respective phases of the first master sleeve 26 and the second master shaft 32 are brought into phase alignment with each other and phases of the second master sleeve 31 and the first master shaft 25 are brought into phase alignment with each other, and consequently, the first and second splined openings $8_1$ and $8_2$ and the third engaging part $9_3$ on the torque converter unit 6' side and the first and second engaging parts $9_1$ and $9_2$ and the third splined opening $8_3$ on the transmission 5 side are brought into alignment with each other in their respective phases. Thereafter, the first and second movable tables 11 and 12 are moved backwards, so that the first master shaft 25 and the first master sleeve 26 are disengaged from the first and second splined openings $8_1$ and $8_2$ and the third engaging part $9_3$. The second master sleeve 31 and the second master shaft 32 are disengaged from the first and second engaging parts $9_1$ and $9_2$ and the third splined opening $8_3$. Thereafter, the movable frame 10 is swung to be moved backwards to the retracted position, and the engine 4 and the transmission 5 are brought together so that the respective splined openings $8_1$, $8_2$, $8_3$ and the respective engaging parts $9_1$, $9_2$, $9_3$ are coupled with each other.

Thus, according to the present invention, before a first workpiece and a second workpiece are brought near to one another for assembly, a movable frame is placed into the space between the two workpieces, and thereby a rotary body provided on the first workpiece and the rotary shaft provided on the second workpiece can be automatically phase aligned so as to be coupled with each other. Thereafter, the movable frame is retracted out of the space and the first workpiece and the second workpiece are then brought together. The rotary body provided on the first workpiece and the rotary shaft provided on the second workpiece can thus be phase aligned automatically so that a recessed portion in one workpiece and the protruding portion in the other workpiece are in alignment with each other. The retraction of the movable frame from the space enables the first workpiece and the second workpiece to be brought together and coupled to each other, without obstruction, and thus automation of the assembly is possible. Further, in a second feature of the present invention, automation of assembly of an engine provided with a torque converter, and the transmission can be achieved.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A phase adjusting apparatus in an assembling machine for assembling a first workpiece on which a rotary body is rotatably mounted and a second workpiece on which a rotary shaft is rotatably mounted, said first and second workpieces being positioned to face each other such that the axis of the rotary body and the axis of the rotary shaft are in alignment with each other on the same axis, said rotary body having an engaging opening therein, wherein said engaging opening has first engaging means on the periphery thereof and said rotary shaft having second engaging means on the periphery thereof, wherein said first and second engaging means are engaged with each other when said workpieces are assembled with each other, said phase adjusting apparatus comprising a movable frame means movable into and out of the space formed between the first workpiece and the second workpiece, a first movable table means mounted on said movable frame means, said first movable table means being operable to advance toward and retract from said rotary body and a second movable table means mounted on said movable frame means, said second movable table means being operable to advance toward and retract from said rotary shaft, a master shaft mounted on said first movable table means having an engaging part corresponding with said engaging means of said rotary shaft, first rotation means for rotating said master shaft, and a first detecting means for detecting the phase of said master shaft, a master sleeve mounted on said second movable table means, having an engaging opening corresponding with said second engaging means of said rotary body, second rotation means for rotating said master sleeve, and a second detecting means for detecting the phase of said master sleeve.

2. A phase adjust apparatus as set forth in claim 1, wherein said movable frame means rotates into and out of the space formed between said first and second workpieces.

3. A phase adjusting apparatus in an assembling machine for assembling a first workpiece comprising an engine having a crankshaft, and a torque converter unit coupled to said crankshaft, said torque converter unit comprising a turbine disc wheel, a stator wheel and a pump wheel, and a second workpiece comprising a transmission having a main shaft, said first and second workpieces being positioned to face each other such that the axis of the torque converter unit and the axis of said main shaft are in alignment with each other on the same axis, wherein when said first and second workpieces are brought together, a first splined opening formed on said turbine wheel is coupled with a first engaging means formed on the outer periphery of said main shaft, a second splined opening formed on said stator wheel is coupled with a second engaging means formed on a stator shaft on the outer periphery of said main shaft, and a third splined opening formed on a pump gear on the outer periphery of said stator shaft on said transmission is coupled with a third engaging means formed on said pump wheel, said phase adjusting apparatus comprising a movable frame means movable into and out of the space formed between said first and second workpieces, a first movable table means mounted on said movable frame means, said first movable table means being operable to advance towards and retract from said torque converter unit and a second movable table means mounted on said movable frame means, said second movable table means being operable to advance towards and retract from said main shaft, wherein said first movable table means includes a first master shaft having two engaging means corresponding with said first engaging means and said second engaging means, a first rotating means for rotating said first master shaft, and a first detecting means for detecting the phase of said first master shaft, said first movable table means further including a first master sleeve having an engaging opening corresponding with said third splined opening, second rotating means for rotating said first master sleeve, and a second detecting means for detecting the phase of said first master sleeve, and wherein said second movable table means includes a second master sleeve having two engaging openings corresponding with said first splined opening and said second splined opening, third rotating means for rotating said second master sleeve, third detecting means for detecting the phase of said second master sleeve, a second master shaft having an engaging means corresponding with said third engaging means, fourth rotating means for rotating said second master shaft, and a fourth detecting means for detecting the phase of said second master shaft.

4. A phase adjust apparatus as set forth in claim 3, wherein said movable frame means rotates into and out of the space formed between said first and second workpieces.

* * * * *